Patented Apr. 4, 1939

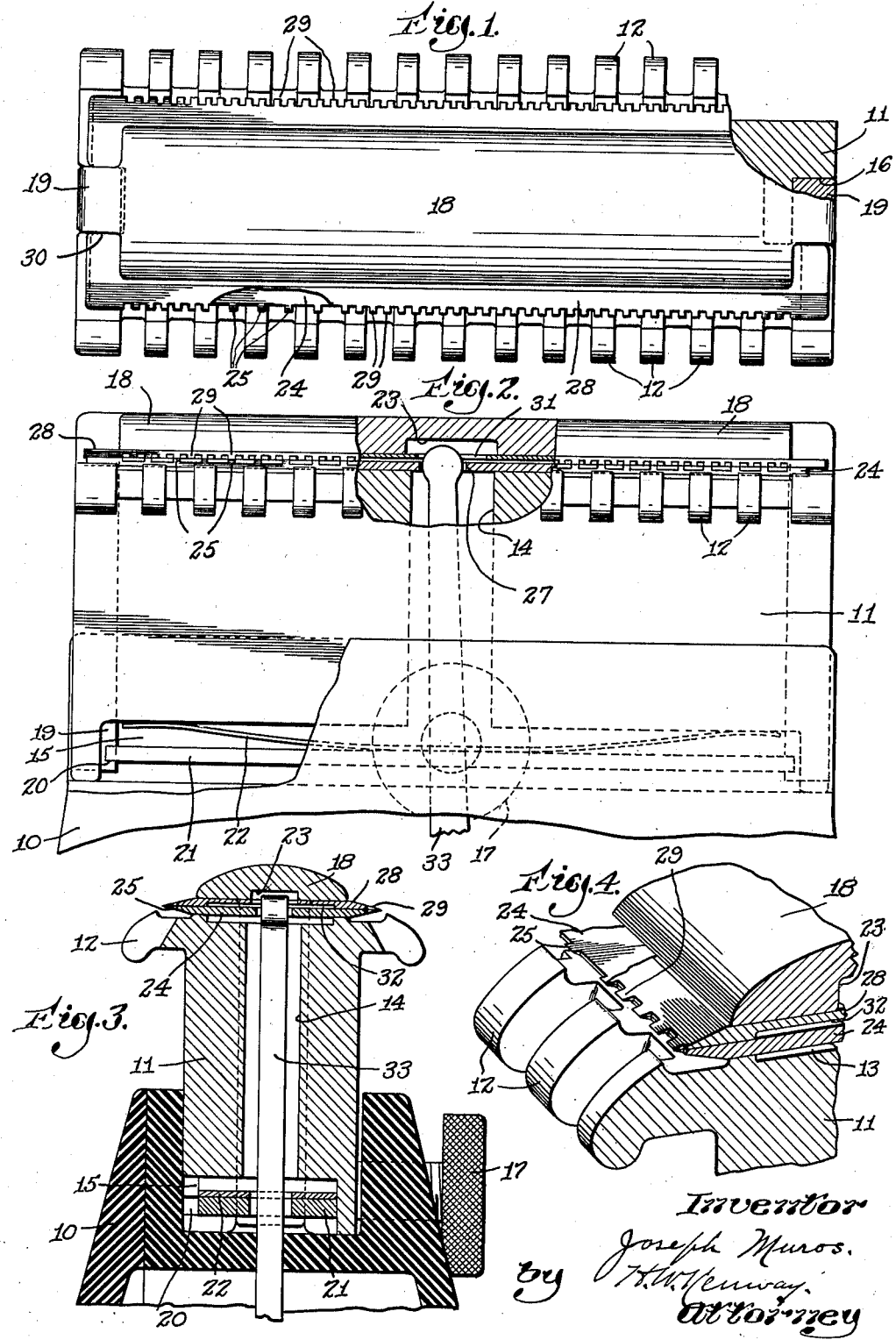

2,152,815

UNITED STATES PATENT OFFICE 2,152,815

SHAVING IMPLEMENT

Joseph Muros, Cambridge, Mass., assignor to Gillette Safety Razor Company, Boston, Mass., a corporation of Delaware Application April 10, 1936, Serial No. 73,735

4 Claims. (Cl. 30—43)

This invention relates to implements of the vibratory shearing type employed for shaving without the use of lather.

Objects of the present invention are, in general, to improve the construction and convenience of manipulation and safety of implements of this class, particularly in respect to their shearing elements. I have discovered that a pair of thin replaceable blades may be employed as the shaving elements and these consequently may be manufactured with great accuracy and convenience independently of the implement as a whole and then operatively assembled therein. An important advantage of economy in construction, therefore, is achieved in the implement of my invention as compared to implements heretofore known in which at least one shearing element has comprised a steel block or frame piece requiring extensive machining in the formation of shearing edges or surfaces. Distinguished from such construction the shearing members of my invention may be thin, flat, elongated blades of the general type heretofore used in safety razors and consequently adapted for manufacture for replacement by existing machinery with good advantage.

As herein shown these blades are removably maintained in operative position and are easily accessible for purposes of cleaning or replacement. One satisfactory and novel means of retaining the blades consists in spaced retaining members arranged for interlocking engagement with both blades in such manner as to hold one blade stationary and guide the other in a path of longitudinal reciprocation. As herein shown, the retaining members comprise part of the cap which is herein used for the additional function of maintaining the co-operating blades at all times in yielding engagement, thus insuring satisfactory shearing relation between them.

Another feature of the invention consists in a novel shearing blade or a novel set of co-operating shearing blades per se. As herein shown, the blades have their edges divided by notches into a plurality of spaced shearing teeth, the spacing of the teeth being unequal in the respective blades. In the embodiment of the invention herein shown the teeth of one blade are separated by substantially twice the spacing of the teeth of the other blade and the blades are given a relative reciprocation of sufficient amplitude to carry one tooth of the long-spaced blade past two teeth of the short-spaced blade. One result of this arrangement is to allow a longer interval than heretofore for the individual hairs to enter between the teeth into shearing position so that they are cleanly cut without tendency to kick out.

Another feature of the invention contributing to its safety in use consists in the combination with upwardly curved guard teeth of a stationary shear blade located with its edge closely adjacent to the guard teeth so that there is little or no possibility of the skin of the user entering the space between the guard teeth and the edge of the blade where it would be likely to be cut. In this relation I also employ a reciprocatory blade which is disposed beneath the stationary blade and thus the movable and more dangerous blade is fully protected and safety of the user insured.

These and other features of the invention will be best understood and appreciated from the following description of a preferred embodiment thereof, selected for purposes of illustration and shown in the accompanying drawings, in which:

Fig. 1 is a top plan view of the device, one corner being shown as broken away;

Fig. 2 is a view in side elevation with portions of the device shown as broken away;

Fig. 3 is a view in central cross-section;

Fig. 4 is a fragmentary view in perspective partly in section; and

Figure 5:
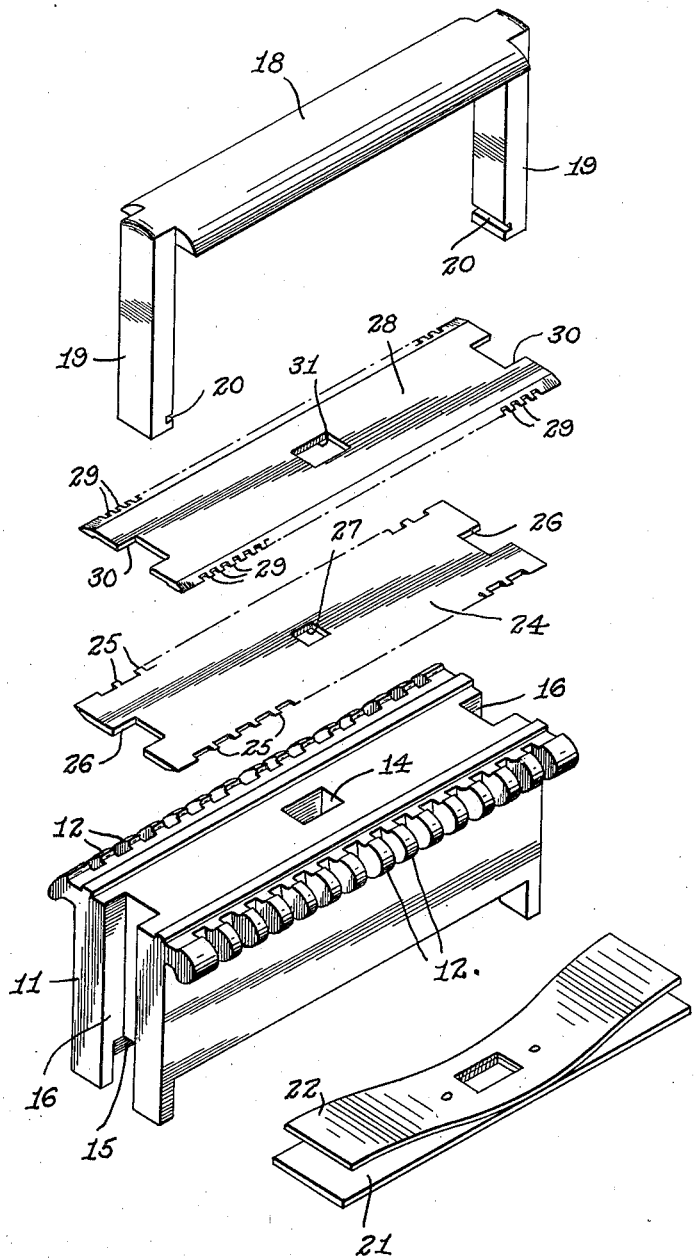
Fig. 5 is a view in perspective showing the parts of the device in exploded relation.

The implement comprises an elongated casing 10, only partly shown in the drawings, which serves also as a handle and in the forward end of which is provided a recess or socket wherein is clamped the head carrying the operating blades. It will be understood that the casing 10 houses a small motor, not shown, which is connected through an operating lever 33 to the movable blade and by means of which the latter is maintained in a state of rapid vibration when the implement is in use.

The guard member 11 comprises a substantially rectangular metal block, flanged along both edges at its upper end and provided with oppositely arranged, upwardly curved guard teeth 12 of the usual construction. The guard block is provided with a shallow channel 13 in its upper face for the purpose of reducing friction between it and the reciprocatory blade supported thereon. It is also provided with a central vertical passage 14 and with a rectangular chamber 15 in its lower face, the chamber opening out through one side wall of the guard block. In each end the guard block is provided with a vertical channel 16, rectangular in cross-section and opening at its lower end into the chamber 15. The block is retained by a thumb screw in a rectangular socket which is provided in the end of the casing 10.

The implement includes also a cap member 18 which extends longitudinally of the guard block and above the same. The cap is somewhat narrower than the guard member and upwardly convex. It serves to retain the thin flat elongated blades of the implement in place, as will be presently described, and co-operates with the guard teeth 12 in determining the shaving angle of the implement with respect to the face of the user. The cap 18 is provided at each end with a downwardly extending leg 19 rectangular in cross-section and of substantially less width than the body of the cap. The two legs 19 are arranged to slide in the vertical channels 16 in the ends of the guard block. Each of the legs is provided near its lower end and in the inner face thereof with a notch or transverse channel 20. A retaining plate 21 may be slipped transversely into the notches 20 when the guard block is removed from the casing 10 and the cap is at all times urged downwardly in yielding manner by a leaf spring 22 which is interposed between the retaining plate 21 and the top wall of the chamber 15. The cap is provided in its lower face with a clearance recess 23 for the end of the operating lever 33 and both the clamping plate 21 and the leaf spring 22 are apertured for the passage of the lever 33.

The implement is provided with co-operating blades which are supported upon the upper face of the guard block. Of these the lower reciprocatory blade 24 lies directly upon the upper face of the guard block. It is provided on each edge with a single bevel forming a cutting edge and these are divided into individual teeth 25 arranged with a relatively wide spacing and separated by square ended recesses. The blade 24 is provided in each end with a rectangular notch 26 shaped to fit transversely upon the legs 19 of the cap member 18 and of sufficient length to permit free endwise reciprocation of the blade. The blade 24 is thus movably mounted upon the guard member with its bevels down. It is provided also with a central aperture 27 in which is received the end of the operating lever 33.

The upper or stationary blade 28 rests upon the reciprocatory blade 24 and is of substantially the same dimensions. It is provided on each edge with a single bevel forming a cutting edge and these edges are divided into individual teeth 29 arranged with a relatively close spacing and separated by square-ended recesses. The blade 28 is provided at each end with a rectangular notch 30 shaped to fit snugly upon the legs 19 of the cap member and so hold the blade positively in a stationary position. For this purpose the notches 30 are appreciably shallower than the corresponding notches 26 of the movable blade 24. The blade 28 is assembled in the implement with its bevel uppermost so that the two co-operating blades present composite double beveled edges. Preferably and as herein shown the stationary blade 28 is provided in its lower face with a shallow channel or recess 32 for the purpose of reducing the friction between the two blades and it is also provided with a centrally disposed, rectangular clearance opening 31 for the end of the operating lever 33. It will be noted that the legs 19 of the cap serve as common means both to hold the stationary blade 28 and to guide the movable blade 24 in its reciprocation.

In one embodiment of the invention the stationary blade 28 is provided with teeth having a width of .010 separated by spaces .008 in length and .008 in depth. The vibratory or reciprocatory blade 24 on the other hand, is provided with teeth having a width of .008 separated by spaces .028 in length and having a depth of .008, that is to say, the spacing of the teeth 25 of the movable blade is more than three times that of the spacing of the teeth 29 of the stationary blade. These relative proportions have been found satisfactory in providing a time interval sufficient to permit an effective opening between the teeth of the assembled blades. Were the spaces of the movable strip 24 the same as those of the stationary blade 28 the action of the blades would tend to kick out the hairs because they would have insufficient time to arrive fully at cutting position. The relatively wide spacing between the teeth of the movable blade 24 provides the proper time allowance.

If it is desired to disassemble the implement for cleaning or replacement of a blade the thumb screw 17 may be loosened and the guard block 11 removed from the casing 10, the operating lever 33 passing freely out of the passage 14 of the guard block. The clamping plate 21 may then be moved transversely out of the recess 15, thereby disengaging the ends of the legs 19 and freeing the cap 18. The latter may now be lifted from the guard and both blades thus released. In reassembling the parts of the implement it will be noted that the spring 22 is placed under compression and this pressure is transmitted yieldingly to the face of the cap 18 so that the two blades are maintained continuously under yielding pressure and an effective shearing cut is insured between the co-operating teeth of the superposed blades.

In use the implement is moved slowly over the face, in one direction or the other, with the guard teeth and cap determining the proper angle of inclination to bring the common edge of the co-operating blades into contact with the skin of the user. The lower blade 24 is maintained in a state of rapid vibration with an amplitude sufficient to carry the advancing shearing edge of each tooth 25 past the rear edge of two teeth 29 of the upper stationary blade in each stroke. In the advancing movement of the implement single hairs enter the spaces between the teeth 29 and are thus sheared off close to the skin by the movement of the vibratory blade.

Having thus described my invention what I claim as new and desire to secure by Letters Patent of the United States is:

1. A shaving implement having a member with upwardly curved guard teeth arranged along its opposite edges, a cap having downwardly extending legs engaging said member, and a pair of co-operating replaceable blades disposed between said guard teeth, arranged for relative endwise reciprocation and being superposed in face to face engagement and shaped to make interlocking engagement with said legs.

2. A dry shaving implement comprising a substantially rectangular body with serrated flanges forming guard teeth along its upper edges and vertical channels in its opposite end faces, a cap member having parallel legs arranged to fit in said channels, and a pair of blades superposed in face to face engagement between said body and said cap, one blade being stationary and notched to fit the legs of the cap and the other being movable and notched for guiding engagement with said legs.

3. A dry shaving implement comprising a rectangular guard member having teeth along its upper edges and a supporting surface for a reciprocatory cutter, a cutter-retaining member having legs extending downwardly through said guard member, a plate arranged to interlock with the legs of said retaining member, and a spring arranged to maintain a clamping pressure on the retaining member through the medium of said plate.

4. A shaving implement including in its structure a metallic head having an upper blade-supporting face and a lower side opening, shearing blades carried by the head, a retaining cap for the blades having legs extending down into the side opening of the head, and a sidewise removable plate in said opening shaped to interlock with said legs.

JOSEPH MUROS.